Figure 4:
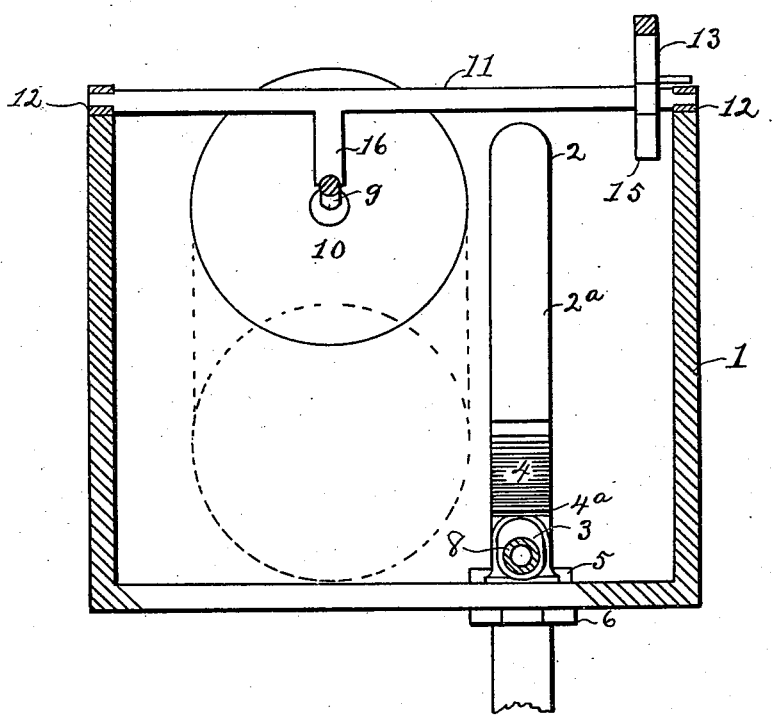

No. 665,825. Patented Jan. 8, 1901.
S. C. CARROLL.
FLUSHING TANK FOR WATER CLOSETS, &c.
(Application filed Feb. 26, 1897. Renewed June 16, 1900.)
(No Model.) 2 Sheets—Sheet 1.
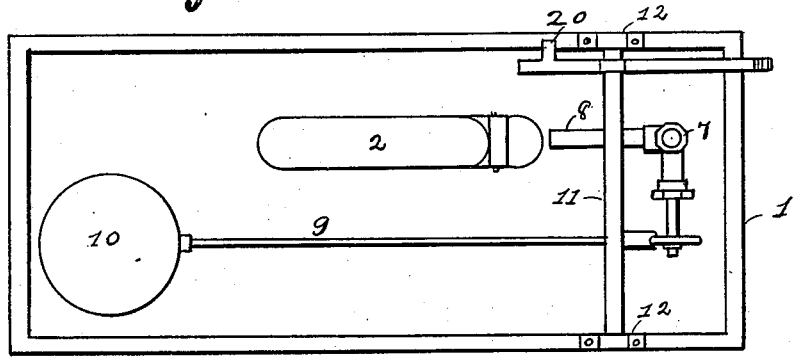
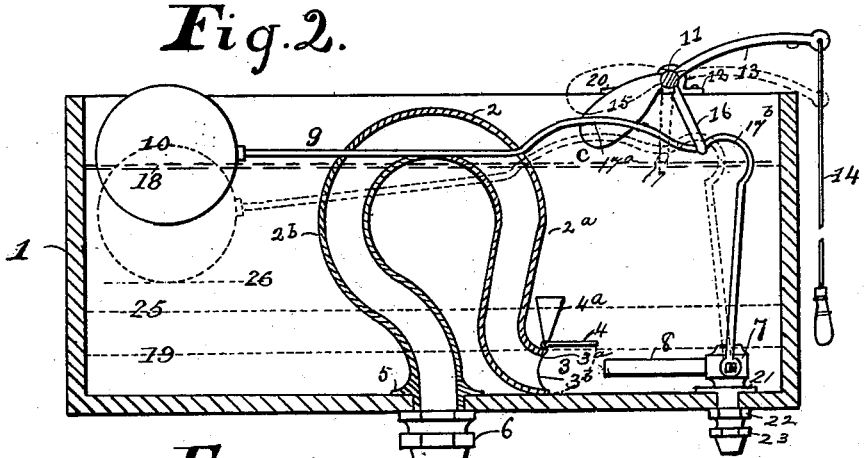
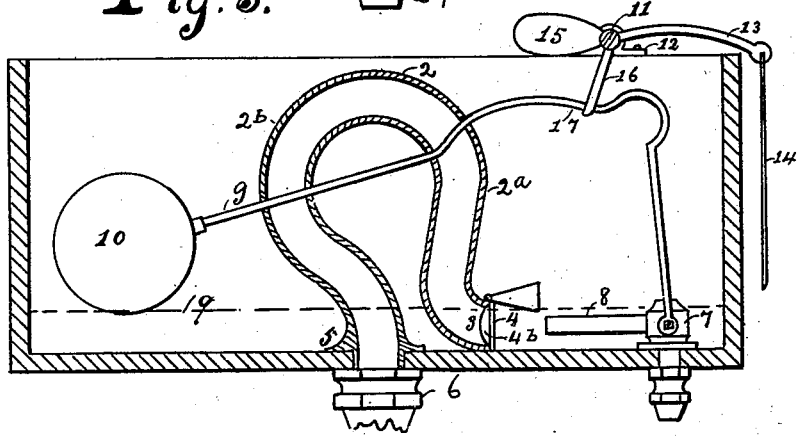
Witnesses.
Samuel C. Carroll, Inventor
Per L. H. Lewis
Attorney

UNITED STATES PATENT OFFICE.

SAMUEL C. CARROLL, OF DALLAS, TEXAS.

FLUSHING-TANK FOR WATER-CLOSETS, &c.

SPECIFICATION forming part of Letters Patent No. 665,825, dated January 8, 1901.

Application filed February 26, 1897. Renewed June 16, 1900. Serial No. 20,527. (No model.)

*To all whom it may concern:*

Be it known that I, SAMUEL C. CARROLL, a citizen of the United States, residing at Dallas, in the county of Dallas and State of Texas, (whose post-office address is Dallas, Texas,) have invented a new and useful Improvement in Flushing-Tanks for Water-Closets, Urinals, Sinks, &c., of which the following is a specification.

In the ordinary closet-tank there are two parts subject to constant wear—viz., the siphon-valve and the float-valve. By the adoption of an immovable siphon I do away with the most destructible source of the leakage and annoyance, as a leak in the siphon-valve will cause the float-valve to open slightly, whereby the seat and disk of said float-valve soon become worn and unfit for use.

It is one purpose of my invention to provide an immovable siphon, a gate having a novel construction, whereby its manufacture is facilitated, and to combine with said gate automatic means for deflecting the jet of water from the supply-valve away from the inlet of the siphon.

It is my further purpose to combine with an immovable siphon a float having a gate in combination running at right angles with said float pivotally attached to the upper edge of the inlet on the short leg of the siphon operated by the water in the tank.

It is my purpose also to provide a suitable boxing for immovable siphon-tanks for the axle in combination with a lever and projecting arm to be mounted on the walls of said tanks, whereby the arm may be adjusted to connect with a float or supply valve at whatever point the latter may be located.

The invention consists to these ends in the several novel features of construction and new combination of parts hereinafter fully set forth and then defined in the claims annexed to this specification.

In order to enable others to make and use my said invention, I will describe the same in detail, reference being made to the accompanying drawings, wherein—

Figure 1 is a plan view of the flushing-tank. Fig. 2 is a vertical longitudinal section of a flushing-tank, showing the device ready for action while the water is at line 18. Fig. 3 is a vertical section through Fig. 1, showing the device at low-water line 19 and the float $4^a$ in a horizontal position deflecting the water impinging against the gate 4 from spattering out of the tank. At this juncture the float 10, in combination with the rod 9, opens float-valve 7 to its full capacity, causing the water from the tube 8 to impinge against the gate 4, whereby it becomes greatly agitated and intermingled with air before entering the openings $3^a$ and $3^b$, thus causing the siphonage to break noiselessly, whereby the tank is allowed to refill. Fig. 4 is a cross-section of the tank on a line to the right of axle 11.

In the drawings the reference-numeral 1 designates a flushing-tank, which may be of any approved pattern or material, having at a suitable point, preferably at the bottom, a supply-valve of usual construction adapted to be closed by the rising of a float 10 when rigidly attached to the rod 9. The float-valve 7 is rigidly secured to the floor of the tank in conjunction with the flange 21 and lock-nut 22. The supply-pipe may be attached to the coupling 23 in the usual form.

Numeral 2 represents the siphon in position. $2^b$ represents the long leg of siphon 2, the protruding end 24 being rigid, whereby the siphon 2 may be secured to the floor of the tank 1 in conjunction with flange 5 and lock-nut 6. The flush-pipe may be rigidly attached to the protruding end 24 in the usual form. From the rigid end 24 the long leg $2^b$ extends up to a point near the top of the tank 1, where it forms a return-bend, and descends to a point near the bottom, the descending branch being designated by the numeral $2^a$, having the inlet 3 formed thereon in a horizontally-disposed position. The said inlet 3 is preferably formed to face in a parallel line with the legs of the siphon 2. The inlet 3 is of a peculiar shape, having two openings $3^a$ and $3^b$ on the sides of said inlet 3, with a capacity equal to that of the siphon 2. When the gate 4 is before the inlet 3, the openings $3^a$ and $3^b$ constitute an efficient overflow-inlet to the siphon, which conveys the water to the flush-pipe, whereby it descends to the closet-bowl.

On the upper edge of $3^c$ of inlet 3 the gate 4, in combination with $4^a$, is pivotally attached thereto and operated by the water in the tank 1. The gate 4 and float $4^a$ are formed from one piece of sheet-copper or other suitable material having a less specific gravity than an equal volume of water. The gate 4 is turned at right angles to float 4ª. At the lower end of said float half of a common hinge may be soldered thereto. The other half of the hinge may be soldered or bolted to 3ᶜ. A pivot or pin may be inserted in the eyes of the hinge when in position at 3ᶜ, thus forming the construction and attachment of the gate 4 and float 4ª to the inlet 3.

The axle 11, with bearing-boxes 12, lever 13, weight 15, and arm 16, may be constructed of cast malleable iron or other approved material, said axle 11 being adjusted to boxing 12, whereby it is mounted on and rigidly secured to the upper edge of walls of tank 1. The weight 15 and lever 13 are of a novel construction, formed on axle 11 at right angles to said axle 11, the weight 15 having a projection 20 to rest on the upper edge of walls of tank.

The grooved end of arm 16 may be brought to bear on the top of the rod 9 by pulling the chain 14, attached to lever 13. The end of said arm 16 is forced out of the valley 17 onto the accelerating incline 17ª to the opposite side of the vertical line on the rod 9, whereby the float 10 is depressed and locked in a depressed position at 26, thus opening float-valve 7 and allowing a jet of water to be forced through the tube into the inlet 3, causing the instantaneous operation of the siphon 2, whereby the water in the tank is lowered to the closet-bowl until its level reaches the level of the line 19, thus causing the siphon to break noiselessly and the float 10 to disengage incline 17ª from the arm 16 as said float 10 descends to the line 19, whereby the weight 15 will throw the end of said arm 16 to the opposite side of valley 17 against the incline 17ᵇ to remain until float 10 rises to the level of the line 18 and allows weight 15 to fall to its original position, with projection 20 resting on the walls of tank 1.

I may provide a construction of float-valve which can be attached to the upper edge of the walls of the tank, whereby I may connect the supply-pipe in the usual form and extend the discharge-tube from said valve to before the inlet of the siphon. I do not limit myself to the specific form shown.

The chain 14, in combination with lever 13, is pulled, whereby the arm 16, attached to axle 11, is forced out of the valley 17 and on the accelerating incline 17ª of rod 9 to the opposite side of the vertical line, whereby the float 10 is depressed and locked in a depressed position, thus opening valve 7 to allow a jet of water to be forced through tube 8 into inlet 3 on the short leg 2ª of siphon 2, simultaneously forcing the water contained therein through the upper curve on long leg 2ᵇ of siphon 2, causing the instantaneous operation of siphon 2, whereby the water in the tank is lowered to the closet-bowl through the flush-pipe, which may be rigidly attached to the protruding end 24 in the usual form, thus allowing float 10 to descend and disengage rod 9 from the end of arm 16, permitting the weight 15, in combination with axle 11 and boxings 12, to throw said arm 16 against incline 17ᵇ, where it will remain until float 10 will ascend and allow weight 15 to fall to its original position, as in Fig. 2. When the water falls to level of line 25, float 4ª from a vertical to a horizontal position, placing gate 4 before the inlet 3 of siphon 2, diverting the jet away from in front of the inlet 3, causing great agitation in the supply to the column of water to the siphon, whereby it is intermingled with air before entering openings on the sides of said inlet 3, thus allowing the siphonage to break noiselessly and the tank to refill.

What I claim as new, and desire to protect by Letters Patent, is—

1. In a flushing apparatus, the combination with a tank, of a discharge-siphon therein, a supply-pipe arranged to deliver a jet or stream of water axially into the inlet portion of the siphon, a movable gate arranged to move to and from a position in front of the inlet-opening of the siphon and transverse to said jet or stream, means for controlling the movements of said gate by the rise and fall of water in the tank, and suitable means for controlling the flow of water through said supply-pipe.

2. In a flushing apparatus the combination with a tank, of a discharge-siphon therein, a supply-pipe arranged to deliver a jet or stream of water axially into the inlet portion of the siphon, a movable gate arranged to move to and from a position in front of the inlet-opening of the siphon and transverse to said jet or stream, means for controlling the movements of said gate by the rise and fall of water in the tank, a float-operated supply-valve in the supply-pipe, and means for simultaneously depressing the float and opening the valve.

3. In a flushing apparatus, the combination with a tank, of a discharge-siphon therein having a horizontal inlet portion at the foot of its short leg, a supply-pipe arranged to delever a jet or stream of water axially into said inlet portion, a gate pivotally mounted upon the top of said inlet portion and adapted to move to and from a position in front of the inlet-opening and transverse to the path of said jet or stream, means for controlling the movements of the gate by the rise and fall of water in the tank, a float-operated supply-valve in said supply-pipe, and means for simultaneously depressing said float and opening said valve, substantially as described.

4. In a flushing apparatus, the combination with a tank, of a discharge-siphon therein having a horizontal inlet portion at the foot of its short leg, a supply-pipe arranged to deliver a jet or stream of water axially into said inlet portion, a gate pivotally mounted upon the top of said inlet portion and arranged to move to and from a position in front of the inlet-opening of the siphon and transverse to said jet or stream, means for controlling the movements of the gate by the rise and fall of water in the tank, a supply-valve in the supply-pipe, a float and float-rod connected to said valve, and an operating-lever having a projecting arm arranged to engage said float-rod to depress the float and open the valve when the lever is operated.

5. In a flushing apparatus, the combination with a tank, of a discharge-siphon therein, a supply-pipe arranged to deliver a jet or stream of water axially into the inlet portion of the siphon, a movable gate arranged to move to and from a position in front of the inlet-opening of the siphon and transverse to said jet or stream, means for controlling the movements of the gate by the rise and fall of water in the tank, a float-operated valve in the supply-pipe, means for simultaneously depressing the float and opening the valve, and means for temporarily locking the float in depressed position.

SAMUEL C. CARROLL.

Witnesses:
J. A. CROWDERS,
J. R. HAYNES.